US012665625B2

(12) United States Patent
Deng

(10) Patent No.: US 12,665,625 B2
(45) Date of Patent: Jun. 23, 2026

(54) PROTECTIVE CASE HAVING GAS STORAGE FUNCTION FOR ELECTRONIC DEVICE

(71) Applicant: SHENZHEN YISE TECHNOLOGY CO., LTD, Shenzhen (CN)

(72) Inventor: Li Xin Deng, Shenzhen (CN)

(73) Assignee: SHENZHEN YISE TECHNOLOGY CO., LTD, Shenzhen (CN)

( * ) Notice: Subject to any disclaimer, the term of this patent is extended or adjusted under 35 U.S.C. 154(b) by 318 days.

(21) Appl. No.: 18/637,920

(22) Filed: Apr. 17, 2024

(65) Prior Publication Data

US 2025/0141486 A1 May 1, 2025

(30) Foreign Application Priority Data

Oct. 26, 2023 (CN) .......................... 202322894687.5

(51) Int. Cl.
H04B 1/3888 (2015.01)
H04M 1/18 (2006.01)

(52) U.S. Cl.
CPC .......... H04B 1/3888 (2013.01); H04M 1/185 (2013.01)

(58) Field of Classification Search
CPC .............................. H04B 1/3888; H04M 1/185
See application file for complete search history.

(56) References Cited

U.S. PATENT DOCUMENTS 9,204,697 B2 * 12/2015 Yang ...................... A45C 11/00

FOREIGN PATENT DOCUMENTS

| CN | 201480265 U | * | 5/2010 | ........... A45C 11/002 |
| CN | 208337668 U | * | 1/2019 | .............. H04M 1/18 |
| WO | WO-2019144623 A1 | * | 8/2019 | .............. H04M 1/02 |

* cited by examiner

*Primary Examiner* — Zhitong Chen
(74) *Attorney, Agent, or Firm* — HOWARD M COHN and Associates, LLC

(57) ABSTRACT

A protective case having gas storage function for an electronic device is provided, the protective case having the gas storage function for the electronic device includes a housing and a light-transmitting sheet. A first chamber and a second chamber are defined in the housing, the first chamber is configured to accommodate the electronic device, and the second chamber is configured to store gases. A peripheral edge of a front surface of the first chamber extends outward to form an opening of the first chamber, the second chamber is communicated with the first chamber, and a first valve is disposed at a communication position of the second chamber and the first chamber. The light-transmitting sheet is disposed at the opening of the first chamber, and is deformed to bulge as gas in the second chamber is injected into the first chamber.

10 Claims, 8 Drawing Sheets

A-A

4

6

40

5

PROTECTIVE CASE HAVING GAS STORAGE FUNCTION FOR ELECTRONIC DEVICE

TECHNICAL FIELD

The present disclosure relates to a technical field of protective cases, and in particular to a protective case having gas storage function for an electronic device.

BACKGROUND

Currently, although electronic devices generally have a waterproof function, the electronic devices still cannot be soaked for a long time, based on this, waterproof cases being sealingly formed appear on the market, the waterproof cases are provided with light-transmitting layers for users to control touch screens of the electronic devices through the light-transmitting layers when the electronic devices are put inside the waterproof cases, which is convenient for users to use the electronic devices underwater. However, the light transmitting layers are gradually squeezed to be in close contact with the touching screens of the electronic devices in a use process of the waterproof cases, so that the light-transmitting layers cannot isolate conductivity of water, and resulting that the users may fail to control the touching screens of the electronic devices after clicking.

In order to solve such problem, Applicant proposes a protective case for an electronic device in Chinese utility patent having a publication number of CN218103788U, a light-transmitting layer of the electronic device includes a gas bag unit for counteracting water pressure, and touching a screen of the electronic devices underwater may be achieved. However, an inflation device needs to externally connect to the protective case to inflate the gas bag unit in advance before using the protective case, so that the users need to carry the inflation device with them, which is inconvenient.

SUMMARY

The present disclosure aims to provide a protective case having gas storage function for an electronic device to solve problems mentioned in the background.

In order to solve above aims, the present disclosure technical solutions as follows.

The present disclosure provides the protective case having the gas storage function for the electronic device, including a housing and a light-transmitting sheet. A first chamber and a second chamber are defined in the housing, the first chamber is configured to accommodate the electronic device, and the second chamber is configured to store gases. A peripheral edge of a front surface of the first chamber extends outward to form an opening of the first chamber, the second chamber is communicated with the first chamber, and a first valve is disposed at a communication position of the second chamber and the first chamber. The light-transmitting sheet is disposed at the opening of the first chamber, and is deformed to bulge as gas in the second chamber is injected into the first chamber.

Furthermore, the second chamber is disposed on a rear surface of the first chamber.

Furthermore, the second chamber and the first chamber are separated by a dividing partition, a vent hole for communicating the second chamber and the first chamber is defined on the dividing partition, and the first valve is mounted at the vent hole.

Furthermore, the protective case having the gas storage function for the electronic device further includes a pressing sheet, a peripheral edge of a rear surface of the second chamber extends outward to form an opening of the second chamber, the pressing sheet is mounted at the opening of the second chamber, and the pressing sheet is capable of being pressed to deform. The first valve is a first pneumatic check valve, the pressing sheet is pressed to drive the gas in the second chamber to flow into the first chamber through the first valve.

Furthermore, the second chamber is communicated with outside through an inflation port.

Furthermore, the inflation port is defined on the pressing sheet, a second valve is disposed at the inflation port, the second valve is a second pneumatic check valve, the pressing sheet is pressed to drive external gas to flow into the second chamber through the second valve.

Furthermore, the protective case having the gas storage function for the electronic device further includes a sealing cover, the sealing cover is movably mounted on the housing for covering the inflation port or exposing the inflation port.

Furthermore, the protective case having the gas storage function for the electronic device further includes a clamping component. A slot hole for communicating the first chamber and outside is defined on the housing, and the slot hole is defined corresponding to a charging interface of the electronic device. The clamping component is movably disposed on the housing, a sealing block is disposed on the clamping component, and the sealing block is capable of inserting into the slot hole or getting out of the slot hole as the clamping component swings.

Furthermore, the housing includes suction cups disposed on a bottom wall of the first chamber, the suction cups are configured to adsorb and fix the electronic device.

Furthermore, a transparent plate is further disposed on a rear portion of the housing, the transparent plate is disposed corresponding to a camera of the electronic device.

Beneficial effects of the present disclosure are as follows. When using the protective case having the gas storage function for the electronic device, the gas is stored in the second chamber in advance, and when users arrive at a specific occasion, the first valve is opened, the gas stored in the second chamber flows into the first chamber, when difference between internal pressure and external pressure of the first chamber reaches a certain degree, the light-transmitting sheet is deformed to bulge, so that a gas layer is formed between the light-transmitting sheet and a touch screen of the electronic device to isolate conductivity of water, thereby preventing the touch screen of the electronic device from clicking failure. Compared with the prior art, the protective case for the electronic device of the present disclosure has functions of gas storage and inflation, so that there is no need for the users to additionally carry inflation devices for inflation, the protective case for the electronic device is high is use convenience.

BRIEF DESCRIPTION OF DRAWINGS

Accompanying drawings are used to provide a further understanding of the present disclosure and constitute a part of the specification, which are used to explain the present disclosure together with the embodiments of the present disclosure, and do not constitute a limitation to the present disclosure, in the drawings.

Figure 1:
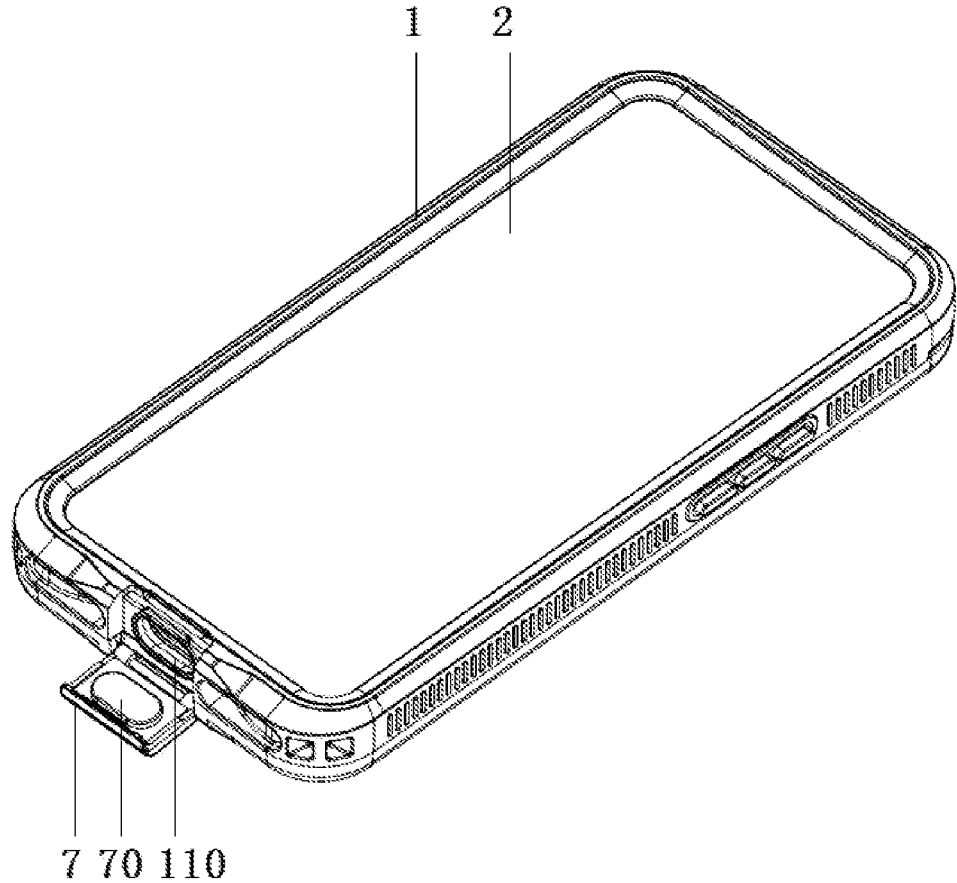
FIG. 1 is a first schematic diagram of an overall structure of the present disclosure.

Reference numerals in the drawings: 1. housing; 11. first chamber; 110. slot hole; 12. second chamber; 13. dividing partition; 130. vent hole; 14. suction cup; 15. transparent plate; 2. light-transmitting sheet; 3. first valve; 4. pressing sheet; 40. inflation port; 5. second valve; 6. sealing cover; 7. clamping plate; 70. sealing block; P. electronic device.

DETAILED DESCRIPTION OF EMBODIMENTS

Technical solutions in embodiments of the present disclosure are clearly and completely described below with reference to accompanying drawings of the embodiments of the present disclosure. All other embodiments obtained by those who skilled in the art based on the embodiments of the present disclosure without creative efforts shall fall within a protection scope of the present disclosure. It is to be understood that the accompanying drawings are provided for reference and illustration only and are not intended to limit the present disclosure. Connection relationships shown in the accompanying drawings are merely for ease of description, and do not limit connection manners.

Referring to FIGS. 1-4, the present disclosure provides a protective case having gas storage function for an electronic device P, including a housing 1 and a light-transmitting sheet 2. A first chamber 11 and a second chamber 12 are defined in the housing 1, the first chamber 11 is configured to accommodate the electronic device P, and the second chamber 12 is configured to store gases. A peripheral edge of a front surface of the first chamber 11 extends outward to form an opening of the first chamber 11, the second chamber 12 is communicated with the first chamber 11, and a first valve 3 is disposed at a communication position of the second chamber 12 and the first chamber 11. The light-transmitting sheet 2 is disposed at the opening of the first chamber 11, and is deformed to bulge as gas in the second chamber 12 is injected into the first chamber 11.

Specifically, before using the protective case having the gas storage function for the electronic device P, the gas is stored in the second chamber in advance, at this time, there is no gas layer in the first chamber 11, the light-transmitting sheet 2 is attached to a touch screen of the electronic device P, so that a user may normally use the electronic device P on the ground, and since the light-transmitting sheet 2 is not bulged, the protective case having the gas storage function for the electronic device P has a good look.

When using the protective case having the gas storage function for the electronic device P, the user first arrives at a specific occasion and then opens the first valve 3, the gas stored in the second chamber 12 flows into the first chamber 11 through the first valve 3, and when difference between internal pressure and external pressure of the first chamber 11 reaches a certain degree, the light-transmitting sheet 2 is deformed to bulge, so that the gas layer is formed between the light-transmitting sheet 2 and the touch screen of the electronic device P, at this time, if the user enters water, the gas layer is capable of isolating conductivity of the water, thereby preventing the touch screen of the electronic device P from clicking failure.

After the user turns back to the ground, use of the protective case having the gas storage function for the electronic device P is finished, at this time, the housing 1 is opened to release the gas in the first chamber 11, so that the light-transmitting sheet 2 is restored to an original state and is attached to the touch screen of the electronic device P, and the users may normally use the electronic device P through light-transmitting sheet 2. Moreover, since the gas in the second chamber 12 is consumed, the user needs to determine whether to inflate or not according to a balance of the gas in the second chamber before using the protective case second times.

It should be noted that even though the light-transmitting sheet 2 is deformed to bulge, the user may also normally use the electronic device P through light-transmitting sheet 2 on the ground. However, in order to beautify and ensure a click effect, the first chamber 11 is generally selected to deflate, so that the light-transmitting sheet 2 is restored to the original state and then to be used second times.

Based on above, the second chamber 12 is provided on the housing 1 for storing the gas, and the first valve 3 is provided for the gas in the second chamber 12 to flow into the first chamber 11, so that the light-transmitting sheet 2 is deformed and separated from the touch screen of the electronic device P. The protective case for the electronic device P of the present disclosure has functions of gas storage and inflation, so that there is no need for the user to additionally carry inflation devices for inflation, the protective case for the electronic device P is high is use convenience. Moreover, the user may switch forms of the light-transmitting sheet 2 according to requirements, which is convenient for the user to use the protective case for the electronic device Pin corresponding occasions.

Furthermore, the light-transmitting sheet 2 is made of a material having a deformation capability and a restoring capability, such as thermoplastic polyurethane (TPU) material, related materials are various thereby not being exemplified the present disclosure one by one.

Figure 2:
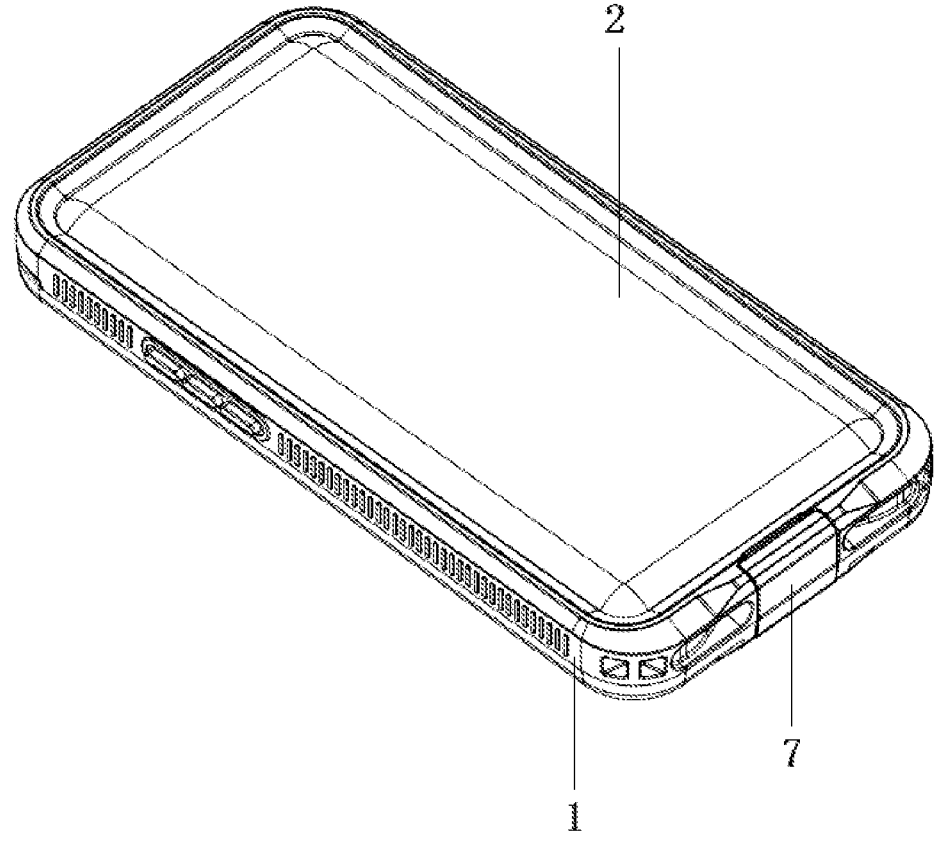
FIG. 2 is a second schematic diagram of the overall structure of the present disclosure
Figure 3:
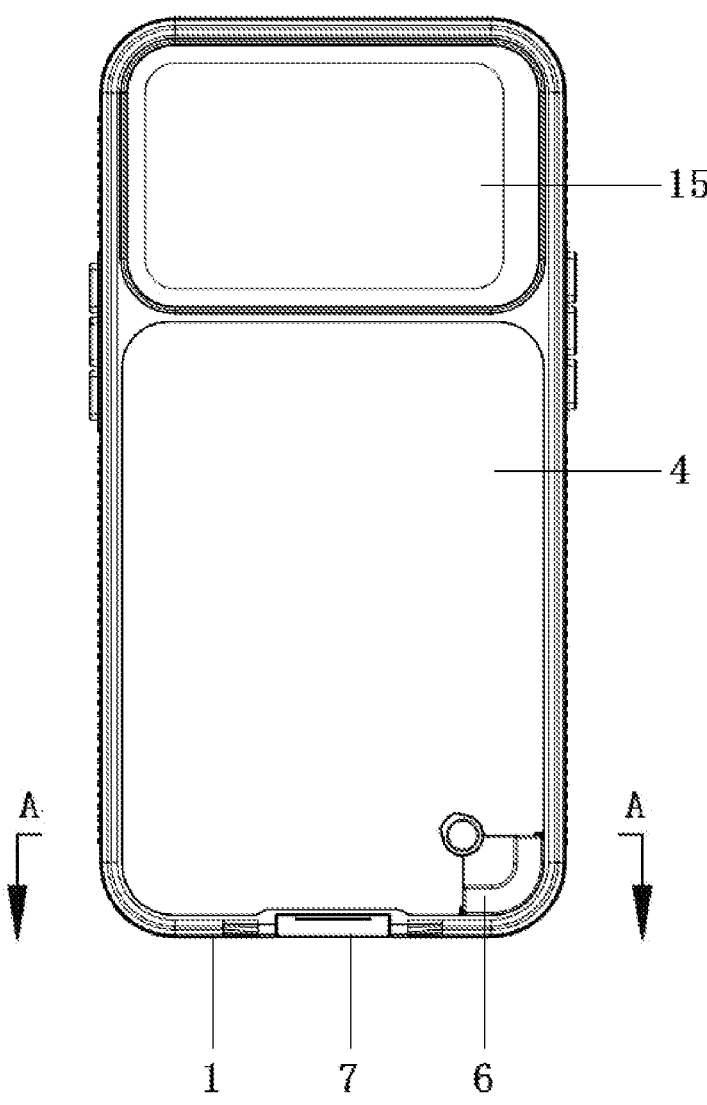
FIG. 3 is a schematic diagram of a rear view of FIG. 2.
Figure 4:
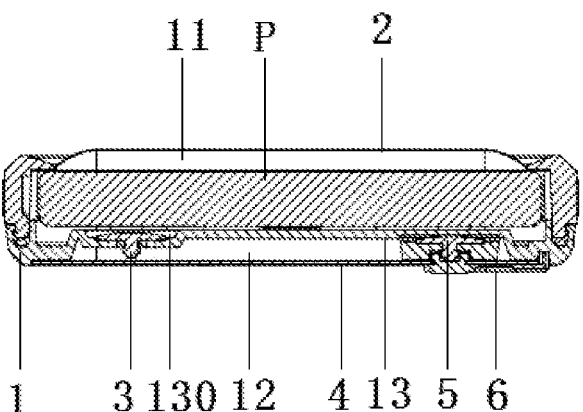
FIG. 4 is a cross-sectional schematic diagram taken along line A-A shown in FIG. 3.
Figure 5:
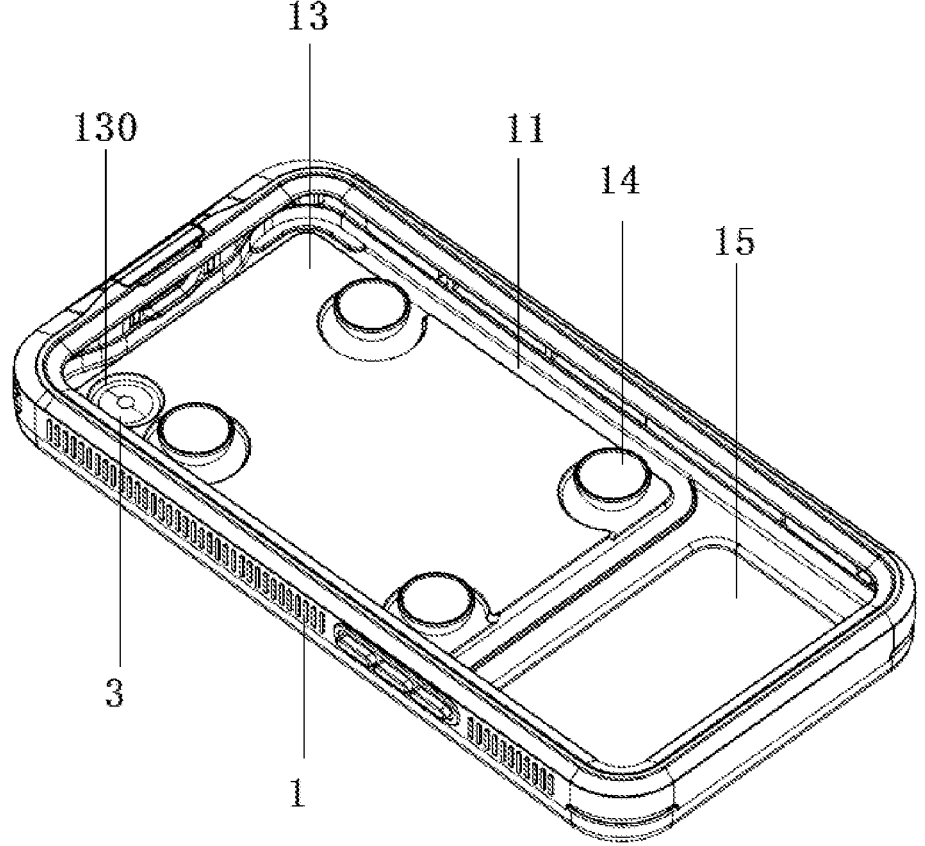
FIG. 5 is a schematic diagram of an internal structure of the present disclosure.
Figure 6:
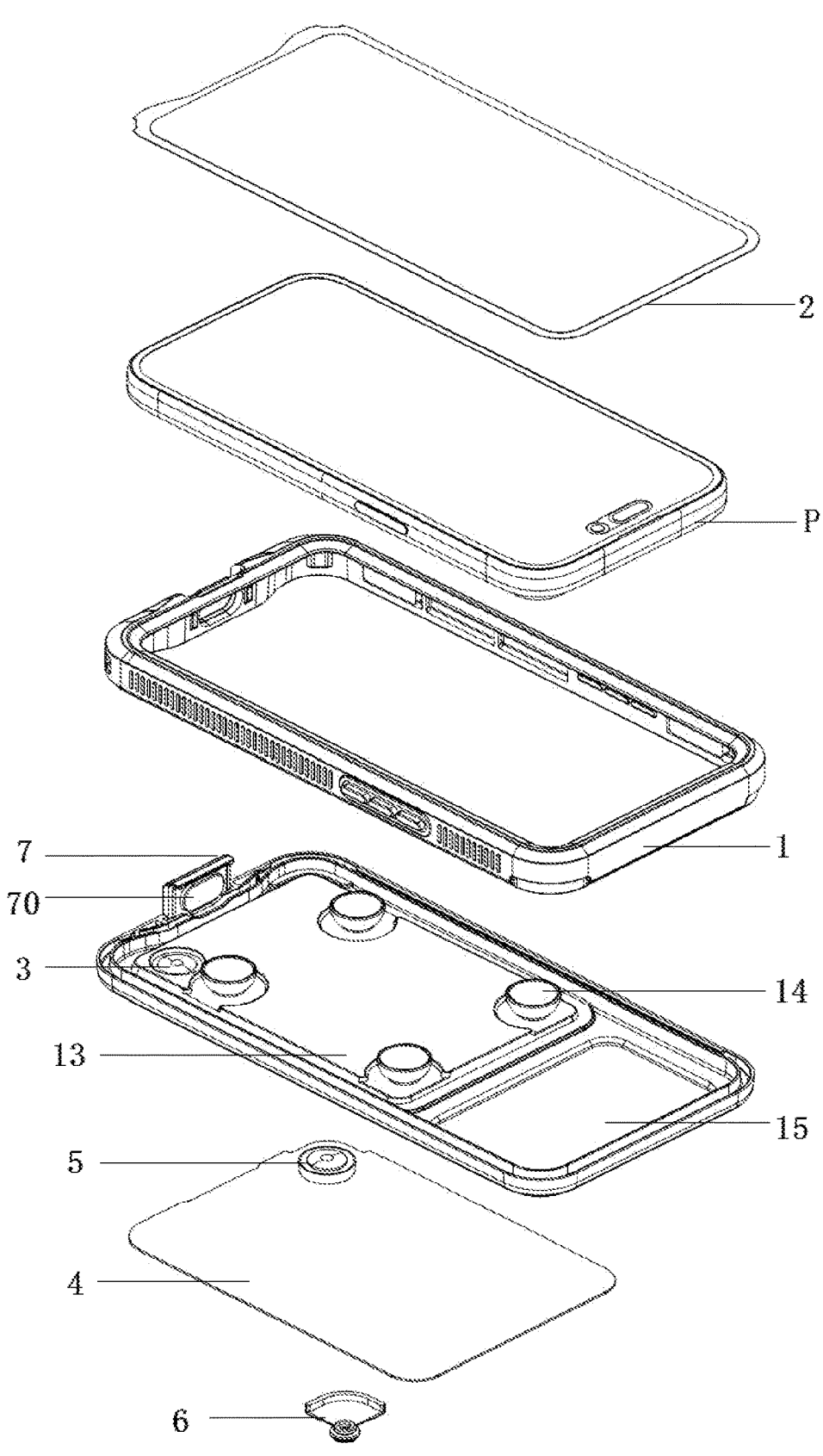
FIG. 6 is a first exploded schematic diagram of the overall structure of the present disclosure.
Figure 7:
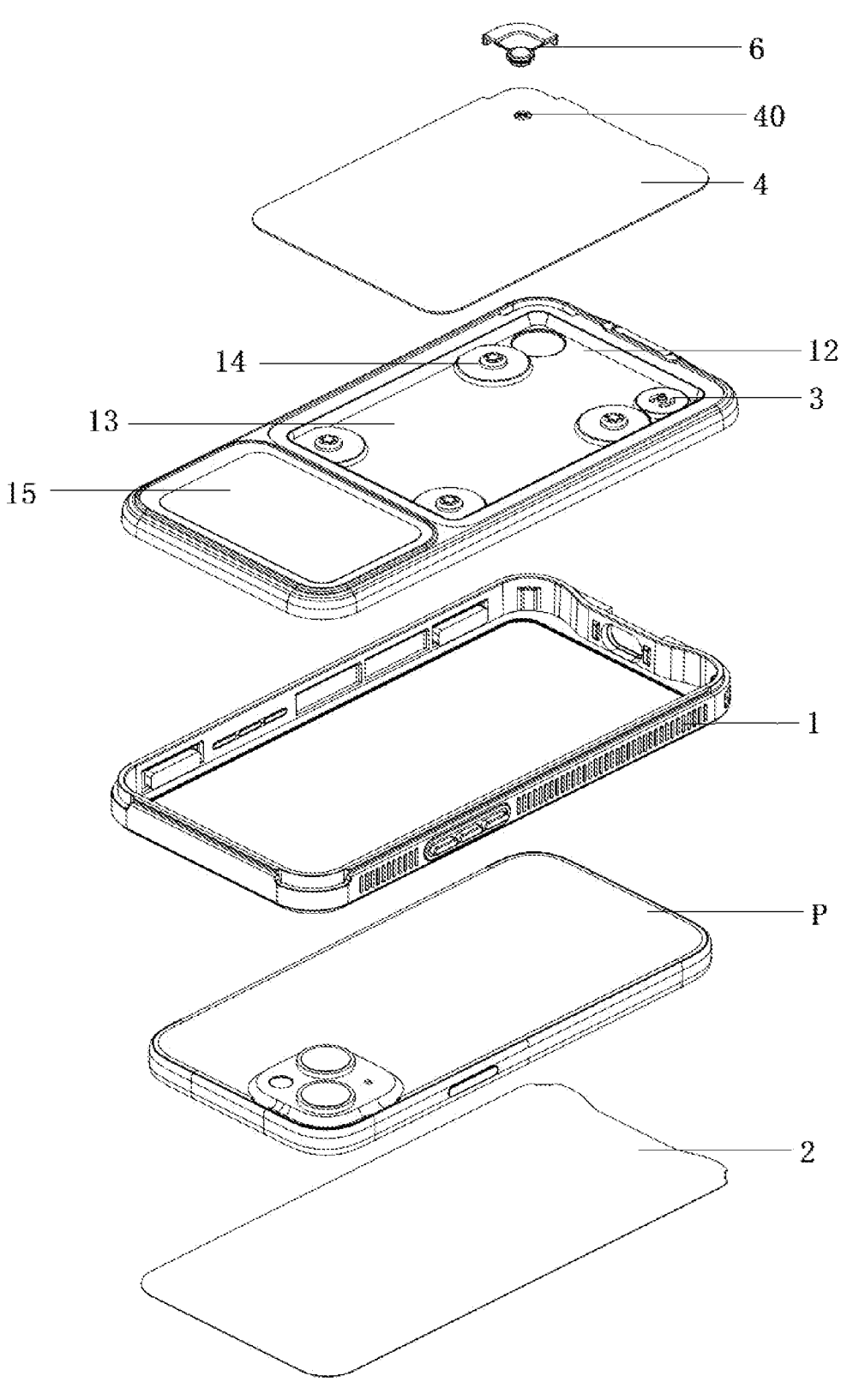
FIG. 7 is a second exploded schematic diagram of the overall structure of the present disclosure.
Figure 8:
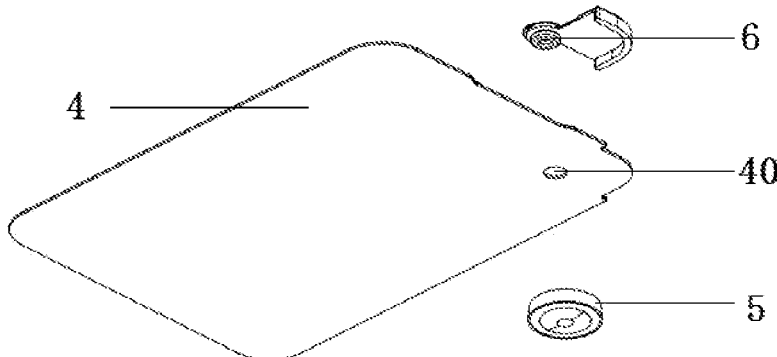
FIG. 8 is a schematic diagram of a partial structure of the present disclosure.

Referring to FIGS. 1-3, the second chamber 12 is disposed on a rear surface of the first chamber 11, such design leaves room for the first chamber 11 to place the electronic device P, and may not cause an increase in a length of the housing 1.

Referring to FIGS. 3-6, the second chamber 12 and the first chamber 11 are separated by a dividing partition 13, a vent hole 130 for communicating the second chamber 12 and the first chamber 11 is defined on the dividing partition 13, and the first valve 3 is mounted at the vent hole 130, such design simplifies corresponding structure, improves sealing performance between the second chamber 12 and the first chamber 11, and avoids leakage between the second chamber 12 and the first chamber 11, and the vent hole 130 is provided for conveniently mounting the first valve 3, thereby providing a unique gas flowing channel for the second chamber 12 and the first chamber 11.

Referring to FIGS. 4-8, in order to facilitate the user to use the gas in the second chamber 12, the protective case having the gas storage function for the electronic device P further includes a pressing sheet 4, a peripheral edge of a rear surface of the second chamber 12 extends outward to form an opening of the second chamber, the pressing sheet 4 is mounted at the opening of the second chamber 12, and the pressing sheet 4 is capable of being pressed to deform. The first valve 3 is a first pneumatic check valve.

Specifically, when using the protective case having the gas storage function for the electronic device P, the pressing sheet 4 is pressed to extrude the gas in the second chamber 12, and the gas flows into the first chamber 11 through the first valve 3 after being extruded, so that the light-transmitting sheet 2 is deformed to bulge. When pressing force leaves the pressing sheet 4, the pressing sheet 4 is restored to an original state thereof, so as to facilitate repeated pressing.

Specifically, the first valve 3 is the first pneumatic check valve, the gas only flows in a single direction, so that the gas in the first chamber 11 is effectively prevented from flowing back to the second chamber 12. Pneumatic check valves have been disclosed in the prior art, so that an internal structure and a working principle thereof are not further described in the present disclosure.

Furthermore, the pressing sheet 4 is made of the material having the deformation capability and the restoring capability, such as the TPU material, the related materials are various thereby not being exemplified the present disclosure one by one.

Referring to FIGS. 4-8, in order to conveniently inflate the second chamber 12, the second chamber 12 is communicated with outside through an inflation port 40, the user may connect the inflation port 40 to an external inflation device (not shown in the drawings) to inject external gas into the second chamber 12. In addition, the chamber may be inflated in other manners, inflation manners thereof are various and are not limited in the present disclosure.

Referring to FIGS. 4-8, in order to get rid of limitation of the external inflation device and enable the user to conveniently inflate the second chamber 12 and the first chamber 11 anytime and anywhere, in the present disclosure, the inflation port 40 is defined on the pressing sheet 4, a second valve 5 is disposed at the inflation port 40, the second valve 5 is a second pneumatic check valve, the pressing sheet 4 is pressed to drive the external gas to flow into the second chamber 12 through the second valve 5.

Specifically, during inflation, the pressing sheet 4 is pressed down to reduce a space of the second chamber 12, and in this process, under an action of air pressure, the external gas enters the second chamber 12 through the second valve 5, and the gas in the second chamber 12 enters the first chamber 11 through the first valve 3 at the same time, thereby completing the inflation.

Specifically, the second valve 5 is the second pneumatic check valve, the gas only flows in the single direction, so that the gas in the second chamber 12 is effectively prevented from overflowing to the outside. The pneumatic check valves have been disclosed in the prior art, so that the internal structure and the working principle thereof are not further described in the present disclosure.

Referring to FIGS. 4-8, the protective case having the gas storage function for the electronic device P further includes a sealing cover 6, the sealing cover 6 is movably mounted on the housing 1 for covering the inflation port 40 or exposing the inflation port 40.

Specifically, when inflating the second chamber 12, the sealing cover 6 is lifted to expose the inflation port 40, so that the external gas enters the second chamber 12 and the first chamber 11. After the inflation, the sealing cover 6 is swung to cover the inflation port 40, so as to achieve waterproof and dustproof effects, thereby preventing the water from entering the second chamber 12 and the first chamber 11 through the inflation port 40 when the user presses the pressing sheet 4 underwater and further avoiding blockage caused by dust accumulation.

Referring to FIGS. 1-5, after using the protective case underwater and then using the protective case on the ground, the housing 1 needs to open to release the gas in the first chamber 11, so as to restore the light-transmitting sheet 2, which is troublesome. Therefore, the protective case having the gas storage function for the electronic device P further includes a clamping component 7. A slot hole 110 for communicating the first chamber 11 and outside is defined on the housing 1, and the slot hole 110 is defined corresponding to a charging interface of the electronic device P. The clamping component 7 is movably disposed on the housing 1, a sealing block 70 is disposed on the clamping component 7, and the sealing block 70 is capable of inserting into the slot hole 110 or getting out of the slot hole 110 as the clamping component 70 swings.

Specifically, during inflation, the sealing block 70 on the clamping plate 7 needs to ensure to insert into the slot hole 110 to prevent the first chamber 11 from air leakage; and during deflation, the clamping plate 7 is lifted to drive the sealing block 70 to get out of the slot hole 110, so that the gas in the first chamber 11 is released to the outside through the slot hole 110, and at this time, the user may charge the electronic device P by passing a USB cable through the slot hole 110 to insert into the charging interface of the electronic device P.

Such structural design enables the protective housing to release the gas in the first chamber 11 without disassembling the housing 1, which facilitates charging of the electronic device P and further improves convenience of use.

Referring to FIGS. 1-5, the housing 1 includes suction cups 14 disposed on a bottom wall of the first chamber 11, the suction cups 14 are configured to adsorb and fix the electronic device P. The suction cups 14 respectively adsorb different parts of the electronic device P, and in a case that an internal space of the first chamber 11 is sufficient, the electronic device P of any size is capable of being fixed, so that applicability of the protective case is improved. Moreover, the suction cups 14 are also capable of limiting shaking of the electronic device P, thereby improving the mounting stability of the electronic device P.

Referring to FIGS. 1-3, a transparent plate 15 is further disposed on a rear portion of the housing 1, the transparent plate 15 is disposed corresponding to a camera of the electronic device P, which provides a shooting channel for the camera and is further convenient for the user to use the electronic device P to shoot underwater.

The above are only preferred embodiments of the present disclosure and are not intended to limit the present disclosure, and any modifications, equivalent replacements and improvements made within a spirit and a principle of the present disclosure shall fall within a protection scope of the present disclosure.

It should be noted that when one component is considered to be "connected" to another component, it may be directly connected to another component, or there may be a centering component at the same time. Unless otherwise defined, all technical and scientific terms used herein have the same meaning as commonly understood by those who skilled in the art to which the present disclosure belongs. It should also be noted that, unless otherwise specified and limited, the terms "mount", "connected with", and "connected to" should be understood in a broad sense, for example, may be a fixed connection, a detachable connection, or an integral connection; may be a mechanical connection or an electrical connection, and may be a communication inside two components. For those who skilled in the art, specific meanings of the above terms in the present disclosure may be understood in specific situations. Terminologies used herein in specification of the present disclosure are for the purpose of describing particular embodiments only and are not intended to be limiting of the disclosure.

In addition, directions or positional relationships indicated by the terms "center", "upper", "lower", "left", "right", "vertical", "horizontal", "inner", "outer", etc. are only for convenience of describing the present disclosure and simplifying description, rather than indicating or implying that a referred device or component must have a specific orientation, and is constructed and operated in a specific orientation, and therefore cannot be understood as a limitation to the present disclosure. In addition, the terms "first", "second", and "third" are used for descriptive purposes only and are not to be construed as indicating or implying relative importance.

What is claimed is:

1. A protective case having gas storage function for an electronic device, comprising:

a housing; and a light-transmitting sheet;

wherein a first chamber and a second chamber are defined in the housing, the first chamber is configured to accommodate the electronic device, and the second chamber is configured to store gases; a peripheral edge of a front surface of the first chamber extends outward to form an opening of the first chamber, the second chamber is communicated with the first chamber, and a first valve is disposed at a communication position of the second chamber and the first chamber; and the light-transmitting sheet is disposed at the opening of the first chamber, and is deformed to bulge as gas in the second chamber is injected into the first chamber.

2. The protective case having the gas storage function for the electronic device according to claim 1, wherein the second chamber is disposed on a rear surface of the first chamber.

3. The protective case having the gas storage function for the electronic device according to claim 2, wherein the second chamber and the first chamber are separated by a dividing partition, a vent hole for communicating the second chamber and the first chamber is defined on the dividing partition, and the first valve is mounted at the vent hole.

4. The protective case having the gas storage function for the electronic device according to claim 3, wherein the protective case having the gas storage function for the electronic device further comprises a pressing sheet, a peripheral edge of a rear surface of the second chamber extends outward to form an opening of the second chamber, the pressing sheet is mounted at the opening of the second chamber, and the pressing sheet is capable of being pressed to deform; the first valve is a first pneumatic check valve, the pressing sheet is pressed to drive the gas in the second chamber to flow into the first chamber through the first valve.

5. The protective case having the gas storage function for the electronic device according to claim 4, wherein the second chamber is communicated with outside through an inflation port.

6. The protective case having the gas storage function for the electronic device according to claim 5, wherein the inflation port is defined on the pressing sheet, a second valve is disposed at the inflation port, the second valve is a second pneumatic check valve, the pressing sheet is pressed to drive external gas to flow into the second chamber through the second valve.

7. The protective case having the gas storage function for the electronic device according to claim 5, wherein the protective case having the gas storage function for the electronic device further comprises a sealing cover, the sealing cover is movably mounted on the housing for covering the inflation port or exposing the inflation port.

8. The protective case having the gas storage function for the electronic device according to claim 1, wherein the protective case having the gas storage function for the electronic device further comprises a clamping component; a slot hole for communicating the first chamber and outside is defined on the housing, and the slot hole is defined corresponding to a charging interface of the electronic device; the clamping component is movably disposed on the housing, a sealing block is disposed on the clamping component, and the sealing block is capable of inserting into the slot hole or getting out of the slot hole as the clamping component swings.

9. The protective case having the gas storage function for the electronic device according to claim 1, wherein the housing comprises suction cups disposed on a bottom wall of the first chamber, the suction cups are configured to adsorb and fix the electronic device.

10. The protective case having the gas storage function for the electronic device according to claim 1, wherein a transparent plate is further disposed on a rear portion of the housing, the transparent plate is disposed corresponding to a camera of the electronic device.

* * * * *